(12) United States Patent
Shtok et al.

(10) Patent No.: US 12,374,146 B2
(45) Date of Patent: Jul. 29, 2025

(54) DETECTING GRAPHICAL ELEMENTS IN CHARTS USING PREDICTED HEATMAPS

(71) Applicant: International Business Machines Corporation, Armonk, NY (US)

(72) Inventors: Joseph Shtok, Haifa (IL); Leonid Karlinsky, Mazkeret Batya (IL); Sivan Harary, Haifa (IL); Ophir Azulai, Tivon (IL)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 17/699,675

(22) Filed: Mar. 21, 2022

(65) Prior Publication Data
US 2023/0298373 A1    Sep. 21, 2023

(51) Int. Cl.
*G06V 30/414* (2022.01)
*G06V 30/10* (2022.01)
*G06V 30/42* (2022.01)

(52) U.S. Cl.
CPC ............ *G06V 30/414* (2022.01); *G06V 30/10* (2022.01); *G06V 30/42* (2022.01)

(58) Field of Classification Search
CPC ...... G06V 30/10; G06V 30/42; G06V 30/412; G06V 30/414; G06V 30/422
See application file for complete search history.

(56) References Cited

U.S. PATENT DOCUMENTS

| | | | |
|---|---|---|---|
| 2017/0185835 A1 | 6/2017 | Appel et al. | |
| 2020/0089946 A1* | 3/2020 | Mallick | G06V 30/416 |
| 2022/0284722 A1* | 9/2022 | Periyakaruppan | G06V 30/184 |
| 2022/0335240 A1* | 10/2022 | Smock | G06N 3/045 |

OTHER PUBLICATIONS

ChartOCR: Data Extraction from Charts Images via a Deep Hybrid Framework. (Year: 2021).*
Towards an efficient framework for Data Extraction from Chart Images (Year: 2021).*
Agarwal, Rishav Raj, "Improving Object Detection with MatrixNets", University of Waterloo, Nov. 2020, 74 pages.
Balaji et al., "Chart-Text: A Fully Automated Chart Image Descriptor", Research Gate (Preprint), Dec. 2018, 12 pages.
Davila et al., "Chart Mining: A Survey of Methods for Automated Chart Analysis", Transactions on Pattern Analysis and Machines Intelligence, May 2020, 20 pages.
He et al., "Mask R-CNN", Computer Vision Foundation (CVF), Facebook AI Research (FAIR), pp. 2961-2969.
(Continued)

*Primary Examiner* — Daniel G Mariam
(74) *Attorney, Agent, or Firm* — Tihon Poltavets

(57) ABSTRACT

An example system includes a processor to receive detected chart regions in a page of a document. The processor is to produce, via a graphical elements detector, predicted heatmaps and bounding boxes for graphical objects in the detected chart regions. The processor is also to apply chart type specific analysis algorithm to the predicted heatmaps and bounding boxes, to extract tabular chart data. The processor can then generate an output data file and a visualization based on the predicted heatmap and the extracted tabular chart data.

20 Claims, 11 Drawing Sheets

(56) References Cited

OTHER PUBLICATIONS

Mell et al., "The NIST Definition of Cloud Computing", National Institute of Standards and Technology, U.S. Department of Commerce, Special Publication 800-145, Sep. 2011, 7 pages.
Poco et al., "Reverse-Engineering Visualizations: Recovering Visual Encodings from Chart Images", Eurographics conference on visualization (EuroVis) 2017, vol. 36, No. 3, Jun. 2017, 11 pages.
Shtok et al., "CHARTER: heatmap-based multi-type chart data extraction", Intelligence workshop at KDD, Aug. 13, 2021, virtual event, 5 pages.

* cited by examiner

DETECTING GRAPHICAL ELEMENTS IN CHARTS USING PREDICTED HEATMAPS

BACKGROUND

The present techniques relate to detecting graphical elements in charts. More specifically, the techniques relate to detecting graphical elements in charts using heatmaps.

SUMMARY

According to an embodiment described herein, a system can include processor to receive detected chart regions in a page of a document. The processor can also further produce, via a graphical elements detector, predicted heatmaps and bounding boxes for graphical objects in the detected chart regions. The processor can also execute a chart type specific analysis algorithm on the predicted heatmaps and bounding boxes to extract tabular chart data. The processor can further generate an output data file and a visualization based on the predicted heatmap and the extracted tabular chart data.

According to another embodiment described herein, a method can include receiving, via a processor, detected chart regions in a page of a document. The method can further include producing, via a graphical elements detector, predicted heatmaps and bounding boxes for graphical objects in the detected chart regions. The method can also further include applying, via the processor, a chart type specific analysis algorithm to the predicted heatmaps and bounding boxes, to extract tabular chart data. The method can also include generating, via the processor, a visualization based on the predicted heatmap and the extracted tabular chart data.

According to another embodiment described herein, a computer program product for detecting graphical elements in charts can include computer-readable storage medium having program code embodied therewith. The computer-readable storage medium is not a transitory signal per se. The program code executable by a processor to cause the processor to receive a document including a chart. The program code can also cause the processor to detect chart regions in a page of the document. The program code can also cause the processor to produce, via a graphical elements detector, predicted heatmaps and bounding boxes for graphical objects in the detected chart regions. The program code can also cause the processor to execute a chart type specific analysis algorithm on the predicted heatmaps and bounding boxes to extract tabular chart data. The program code can also cause the processor to also further generate a visualization based on the predicted heatmap and the extracted tabular chart data.

According to another embodiment described herein, a method can include receiving, via a processor, generated synthetic ground-truth data. The method can also include training, via the processor, a graphical elements detector to predict bounding boxes and heatmaps identifying structures of interest in charts using the synthetic ground-truth data.

According to another embodiment described herein, a system can include processor to generate synthetic data by extending a dataset to increase chart generation variability. The processor can train a graphical elements detector to predict bounding boxes and heatmaps identifying structures of interest in charts using the synthetic ground-truth data.

DETAILED DESCRIPTION

The task of analyzing images of charts and diagrams for extraction of the underlying data, which these graphics were generated from, is used in extended document search and question answering. Extraction of underlying data allows to search for information not only in the body of text but also in the accompanying graphics, which often contain important pieces of information.

However, automated analysis of the chart images may be currently restricted mainly to bar charts and scatter plots, and an approach that enables addressing pie charts. All object detectors used in the current works may use the standard output format of bounding boxes enclosing objects. However, the use of the standard output format of bounding boxes may be a limitation preventing extension of the scope of the task to other chart types. Many important graphical elements in chart images may not be fit to be described by bounding boxes, by the way of standard object detectors. Examples of such graphical elements are centers and radial lines of pie charts, curves of graphs in the line charts, edges in flowcharts, among other graphical elements.

According to embodiments of the present disclosure, a processor can receive detected chart regions in a page of a document. For example, the chart regions in the document may have been detected via a chart regions detector trained using real data. The processor can produce, via a graphical elements detector, predicted heatmaps and bounding boxes for graphical objects in the detected chart regions. The processor can execute a chart type specific analysis algorithm on the predicted heatmaps and bounding boxes to extract tabular chart data. The processor can then generate an output data file and a visualization based on the predicted heatmap and the extracted tabular chart data. Thus, embodiments of the present disclosure enable improved automated detection of various graphical elements as well as extraction of valuable data from various types of graphs. In particular, the embodiments enable recovery of arbitrarily-shaped graphical objects and thus provide a solution for chart types with non-rectangular shapes. As one example, an improved accuracy of up to 10% was observed using heatmap based computation of graphical elements for pie charts. In various examples, the automatically extracted data may also be used to improve search capabilities and Question Answering (QA) in documents. Thus, the embodiments enable improved search capabilities, particularly for certain types of graphical elements in documents.

Figure 1:
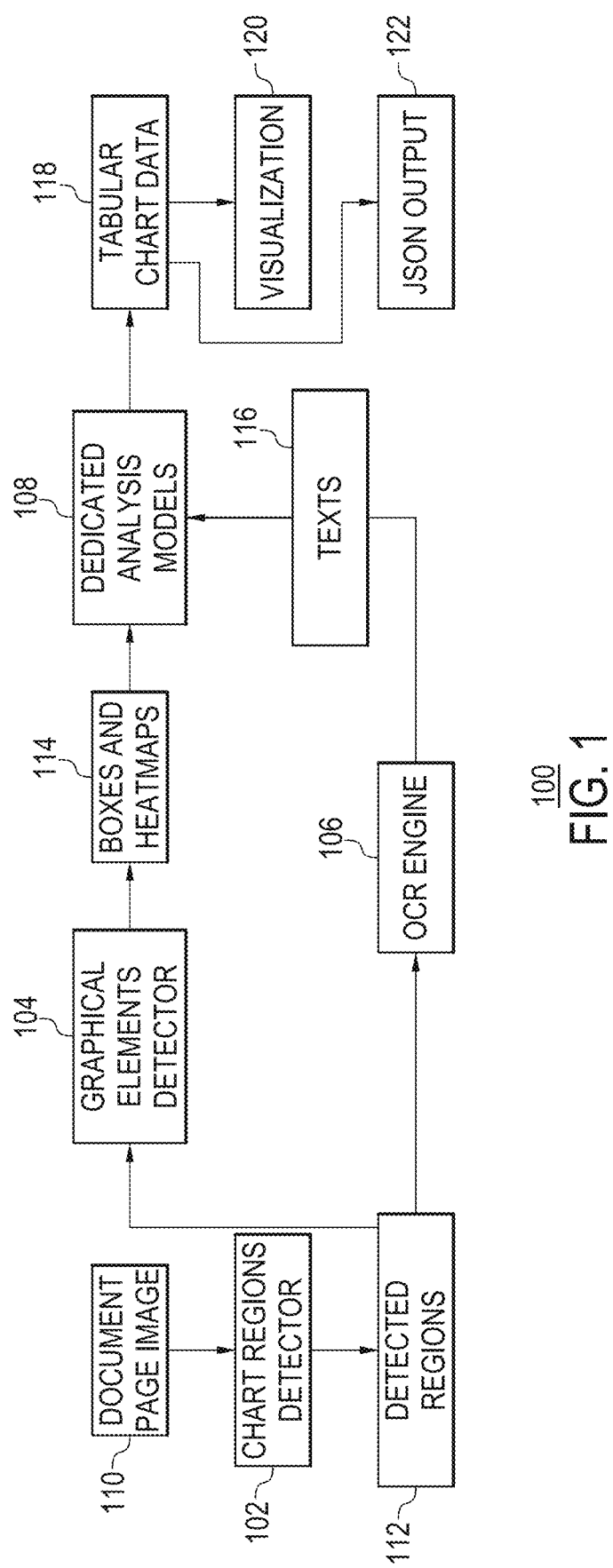
FIG. 1 is a block diagram of an example system for detecting graphical elements in charts using predicted heatmaps.

With reference now to FIG. 1, a block diagram shows an example system for detecting graphical elements in charts using predicted heatmaps. The example system is generally referred to by the reference number 100. FIG. 1 includes a chart regions detector 102 communicatively coupled to a graphical elements detector 104 and an optical character recognition (OCR) engine 106. For example, the chart regions detector 102 and the graphical elements detector 104 may be trained object detectors. The OCR engine may be any suitable OCR system. The system 100 further includes dedicated analysis models 108 communicatively coupled to both the graphical elements detector 104 and the OCR engine 106. The chart regions detector 102 is shown receiving a document page image 110 and outputting detected regions 112. For example, the detected regions 112 may include detected chart, title, caption, and legend regions. The graphical elements detector 104 is shown receiving the detected regions 112 and outputting boxes and heatmaps 114. The OCR engine 106 is shown receiving the detected regions 112 and outputting texts 116. For example, the texts may be texts 116 may be extracted from chart regions and specific chart elements. The dedicated analysis models 108 are shown receiving the boxes and heatmaps 114 and the texts 116, and outputting tabular chart data 118. A visualization 120 is also shown being output by the dedicated analysis models. In addition, Java Script Object Notation (JSON) output 122 is shown being output by the dedicated analysis models. In various examples, the JSON output 122 may be in any other suitable format.

In the example of FIG. 1, the system 100 can receive and process any number of document page images 110 and generate tabular chart data 118, visualizations 120, and JSON output 122. In various examples, the system 100 may be divided into four stages. For example, in Stage 1 of the system 100, the chart regions detector 102 is applied to complete document pages to retrieve regions of charts, title, legend, and caption 1. In stage 2, the graphical elements detector 104 operates on the detected chart regions, producing both bounding box proposals and heatmaps for various chart components. The graphical elements detector 104 may be trained to predict the important encapsulating regions and some graphical elements using bounding boxes. For example, the important encapsulating regions may include outer and inner boxes around the chart. In some examples, the graphical elements may be chart elements such as the bars of a bar chart. The heatmaps may be used to locate fiducials and non-rectangular elements. For example, the fiducials may include axis ticks, pie junctions. Non-rectangular elements may include, for example, circumference and radial lines in pie chart, line-plot graphs, etc. In Stage 3, the chart image and text regions may be processed by the OCR engine 106 for text extraction. Finally, in Stage 4, an analysis module referred to herein as aggregates the data produced so far, applying computer vision algorithms and domain knowledge of different types of charts, to reproduce the original source tabular data represented by the chart. In various examples, the output of Stage 4 may include tabular chart data 118, visualizations 120, and JSON output 122. These example four stages are explained in greater detail below.

Still referring to FIG. 1, the first stage may be executed via the chart regions detector 102. In various examples, the chart regions detector 102 may be a full-page chart region detector. For example, the chart regions detector 102 may be a Faster-RCNN model employing the FPN detection meta architecture and RN50 backbone implemented using the Detectron2 framework and trained on real data. As one example, the chart regions detector 102 may be trained using a k-fold technique given a training set with a small amount of data. For example, the chart regions detector 102 may be trained using five random 90%/10% training/test splits of the real training data. In some examples, the object categories of the model may include: bar chart, pie chart, line chart, scatter plot, legend, title, caption, and x- and y-labels. In some examples, these extracted elements may be shared by a group of charts in a figure, and may therefore not necessarily adjacent to any one of them; in this case. In these examples, page-level logic may also be used to associate the extracted elements with their corresponding charts.

The example second stage may be executed via the graphical elements detector 104. In various examples, the graphical elements detector 104 may be trained using synthetic data. In some examples, generation of synthetic charts data may include extending the FiqureQA dataset, released December 2017, to generate the synthetic data. The FigureQA dataset is a visual reasoning corpus of over one million question-answer pairs grounded in over 100,000 images, containing images that are synthetic, scientific-style figures from five classes: line plots, dot-line plots, vertical and horizontal bar graphs, and pie charts. In some examples, a synthetic chart data generator (not shown) may increase chart generation variability by random background color, random border line color and style, random spaces between the bars, random bar bottom value, allowing uniform bar or slice color, allowing hidden axes, etc. Moreover, in some examples, the synthetic chart data generator (not shown) can add texture to the background, bars, and pie slices. For example, the synthetic chart data generator (not shown) can add texture by pasting tiles from the Describable Textures Dataset (DTD), first released 2014. In various examples, the graphical elements detector 104 may then be trained using the synthetic data to analyze the content of the chart image and discover the graphical elements. The graphical elements detector 104 may be a heatmap based detector. For example, the graphical elements detector 104 may be based on the CenterNet model, version 3 released in April 2019. In some examples, the CenterNet model may be modified to produce a number of heatmap types, in addition to the standard bounding box predictions produced by the model. In some examples, the model of the graphical elements detector 104 may build upon the stacked Hourglass-104 architecture and may be trained only on synthetic chart images generated by the synthetic chart data generator. In various examples, the categories supported by box predictions may include vertical bar, horizontal bar, pie sector, and bar or pie chart regions for cascade-style validation of Stage-1 predictions and refining chart locations. In some examples, the categories supported by heatmaps may include: four corners of each bar (in separate categories), x-ticks, y-ticks, center, circumference and radial lines of the pie chart, corners of the pie sectors, line-segment knee-points and lines of the line charts, and dots of the scatter plots. In some examples, the line-segment knee-points and lines of the line charts may be polygonal lines including these segments. For example, the line of the graph may be broken down into a sequence of linear segments where the knee points are the joints. In various examples, the predictions including boxes and heatmaps 114 made by Stage 2 model may be used later in the Analysis module of Stage 4 for recovery of chart tabular data.

The example third stage is executed using the OCR engine 106. In some examples, texts in charts may contain rotated X-axis labels and numbers with exponential notation. Thus, in various examples, the OCR pipeline of the OCR engine 106 may be composed of the CRAFT text detection model, producing text regions and angles. The OCR pipeline of the OCR engine 106 may also be composed of the CLOVA AI recognition model, first released 2019. In some examples, added support may be included for rotated text and numbers with exponents. For example, the rotated text regions may be handled appropriately before passing to the recognition model of the OCR engine 106. In various examples, because the underlying recognition model such as CLOVA AI may not be designed to handle numbers with exponents, the OCR engine 106 may first detect horizontally aligned text boxes where the text begins with the digits 10, and check if following digits are superscript.

The example fourth stage is executed using the dedicated analysis models 108. For example, each of the dedicated analysis models 108 may build upon recognized texts and graphical objects to discover the tabular data generating the chart. In various examples, there is a dedicated logic for each type of chart. For example, a dedicated logic may be configured to handle bar, pie and line charts, among other types of charts. In various examples, the dedicated analysis models 108 may receive detected bounding boxes, heatmaps and text as input and determine the data graphs underlying the charts in the documents. In some examples, the dedicated analysis models 108 can execute a color-based clustering. For example, the dedicated analysis models 108 can use color-based clustering in order to separate graphs of different colors in line charts. In various examples, the dedicated analysis models 108 can then convert the clusters of pixels into graphs. For example, each of the reconstructed graphs may be a sequences of pixels in the image, one pixel per image column. In some examples, if the numerical axes are available and their values are provided by the OCR engine 106, then the reconstructed graphs may include associated underlying numerical values rather than just pixel values as received.

In the example of bar charts, the dedicated analysis model 108 may rely on the detections of individual bars from the second stage, while filtering the bars. For example, the dedicated analysis model 108 can filter the bars by assuming equal bar width and a common y-level for one of the horizontal edges for all the bars. In some examples, the dedicated analysis model 108 for bar charts may compute bar heights by first recovering the numerical y-axis, if available. For example, the dedicated analysis model 108 for bar charts can recover the numerical y-axis via a Hough transform aligning the numerical OCR outputs on a vertical line, followed by interpolation of the heights of the horizontal edges. Alternatively, in some examples, the dedicated analysis model 108 for bar charts can search for height values written inside or above the bars. For example, the dedicated analysis model 108 for bar charts can detect and retrieve bar labels below the bars, or retrieve the bar labels from a legend by color matching. In various examples, the dedicated analysis model 108 for the bar charts can detect the axis titles by combining the detections of Stage-1 and Stage-2 models. Finally, the dedicated analysis model 108 for bar charts can add common chart elements, such as title and caption (found nearby by the Stage-1 detector). In some examples, chart analysis may be made more robust by also specifically addressing the numerous special cases and issues encountered in the real world data. For example, bar labels may be provided as written numbers inside or above the bars. In some examples, the bars may be composed of stacked bars in colors corresponding to the legend. In some examples, the bars may be floating. In both cases, the dedicated analysis model 108 for bar charts can detect and specify both lower and upper values. In some examples, the bar labels may span a few rows. In these examples, to the dedicated analysis model 108 for bar charts can determine the span and concatenate the rows.

In various examples, the dedicated analysis models 108 may also include a dedicated analysis model 108 for pie charts. For pie charts, the heatmap of radial sectors may be used to determine the partition of the pie circle into sectors, while other heatmaps may be used to stably determine the pie location. For example, the heatmaps corresponding to the pie center and of pie circumference may be used to determine the location of the pie. For example, the dedicated analysis model 108 for pie charts may use both box proposals and image-size heatmaps, produced by the CenterNet detector, for the detection of pie circle center, radius and the radial lines. In some cases, attempts to use only the sectors box proposals may be insufficiently robust, although circles may be well fitted. For example, it may be difficult to filter proposals by the predicted score, especially for narrow sectors. Thus, in some examples, the dedicated analysis model 108 for pie charts may alternatively generate separate heatmaps for a circle circumference, the center point, the radial lines, and the sector corners. Then, the final center and pie circle may be computed by first initiating the centers local maxima of the center point heatmap. For example, multiple pies may be allowed. A voting to a range of radii with the circle point heatmap values may then be executed. For example, each pixel may vote to its distance from the center. Finally, the center locations may be updated as centers-of-mass of pixels at the predicted radius. The dedicated analysis model 108 for pie charts can detect the radial lines associated with disc sectors using the radial lines heatmap within the established circles. In various examples, using the recovered pie geometry, the dedicated analysis model 108 for pie charts can detect the sector labels, if a legend is present, by matching the legend colors to those of sectors. Otherwise, the dedicated analysis model 108 for pie charts may search for lines starting inside the pie disc and leading out, and extract the label using the text piece on the other end as a seed. For example, the lines starting inside the pie disc and leading out may be connected components crossing the pie edge. In various examples, if no connectors are present, then the dedicated analysis model 108 for pie charts can match texts located within or outside of the corresponding sectors.

Figure 11:
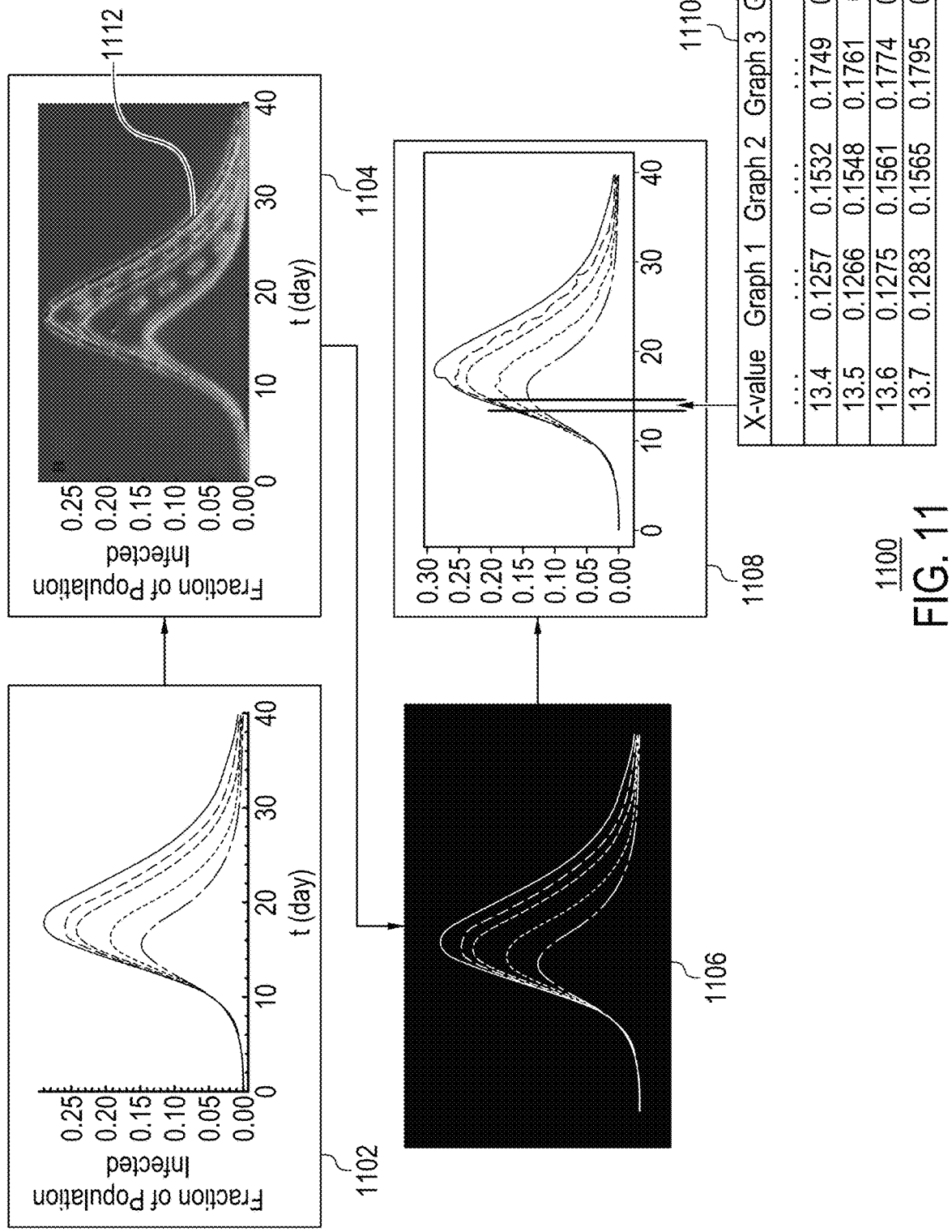
FIG. 11 is an example process illustrating detection and reconstruction of graphical elements in an example line chart.

In some examples, the dedicated analysis models 108 may also include a dedicated analysis model 108 for line charts. For example, for detected line charts, the dedicated analysis model 108 for line charts can use heatmaps for the graph lines, and heatmaps for knee points in the piece-wise linear graphs the model was trained on. In some examples, the dedicated analysis model 108 for line charts can extract individual lines by color-based clustering of the highlighted region. In various examples, the dedicated analysis model 108 for line charts can support non-continuous line types by a stitching algorithm building the output line from available pieces. Because color clustering may not always be accurate, the dedicated analysis model 108 for line charts can use noise filtering and morphological operations to robustify the inference. In various examples, the dedicated analysis model 108 for line charts can be configured to extract x and y numerical axes in a similar way as for the bar charts, and to reconstruct the numeric data as (x, y) pairs. An example line chart reconstruction is shown in FIG. 11.

In various examples, the dedicated analysis models 108 may further include a dedicated analysis model 108 for scatter plots. For example, the dedicated analysis model 108 for scatter plots may use heatmaps of the marker much similar to the heatmap of the line plots knee points used for line charts. The dedicated analysis model 108 for scatter plots can then split the chart area to a grid of boxes and count the number of detected markers in each such box. In various examples, the output of the dedicated analysis model 108 for scatter plots may be a table whose columns are the y values of the grid and whose rows are the x values of the grid. For example, in each cell of the table, the relevant number of detected markers may be indicated for the particular x, y value combination. In some examples, the dedicated analysis model 108 for scatter plots can use marker colors and shapes to match with a detected legend.

In various examples, the dedicated analysis models 108 may further include a dedicated analysis model 108 for flowcharts. For example, the dedicated analysis model 108 for flowcharts may use a heatmap of detected edges in the flowchart.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional stages, or additional object detectors, chart types, etc.).

Figure 2:
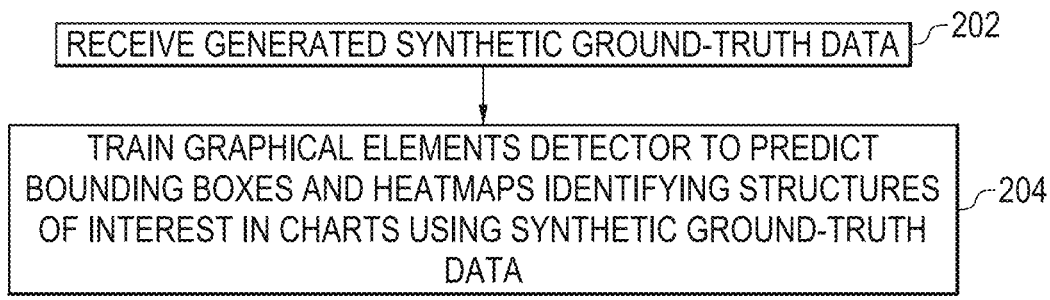
FIG. 2 is a process flow diagram of an example method that can train a detector to predict bounding boxes and heatmaps.

FIG. 2 is a process flow diagram of an example method that can train a detector to predict bounding boxes and heatmaps. The method 200 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8 and used to train the graphical elements detector 104 of system 100.

At block 202, a processor receives generated synthetic ground-truth data. For example, the synthetic ground-truth data may be generated using a dataset such as the FigureQA data set, and increasing chart generation variability by random background color, random border line color and style, random spaces between the bars, random bar bottom value, allowing uniform bar or slice color, allowing hidden axes, etc. In some examples, the processor can also add texture to the background, bars, and pie slices.

At block 204, the processor trains a graphical elements detector to predict bounding boxes and heatmaps identifying structures of interest in charts using the synthetic ground-truth data. In some examples, the graphical elements detector may be based on the CenterNet model.

The process flow diagram of FIG. 2 is not intended to indicate that the operations of the method 200 are to be executed in any particular order, or that all of the operations of the method 200 are to be included in every case. For example, in some embodiments, the processor may receive annotated data instead of the synthetic ground-truth data. Additionally, the method 200 can include any suitable number of additional operations.

Figure 3:
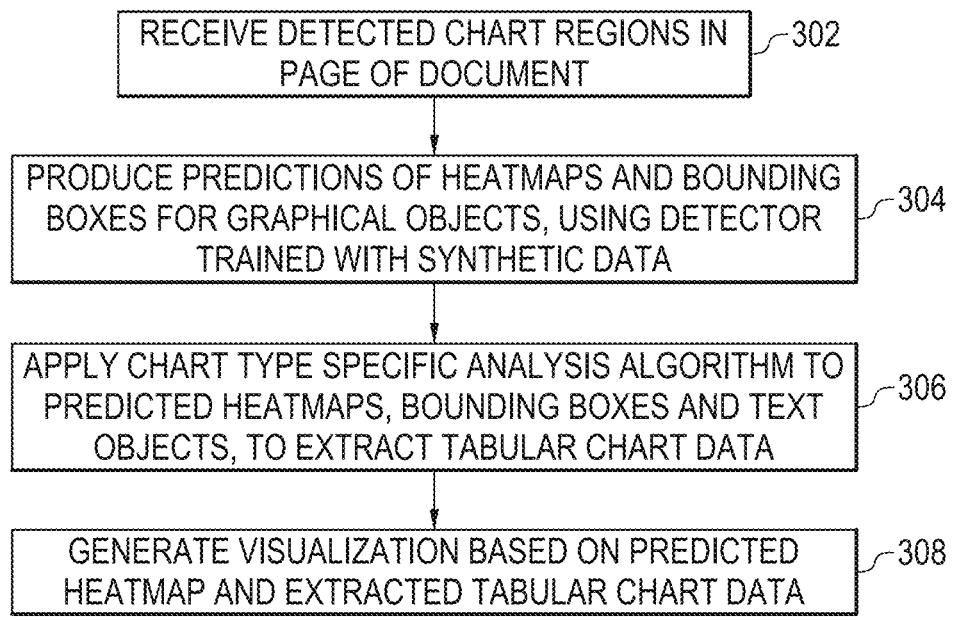
FIG. 3 is a process flow diagram of an example method that can detect graphical elements in charts using predicted heatmaps.

FIG. 3 is a process flow diagram of an example method that can detect graphical elements in charts using predicted heatmaps. The method 300 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 302, a processor receives detected chart regions in a pages of a document. For example, the detected chart regions may be indicated using bounding boxes. In various examples, the chart regions may have been detected using a chart regions detector trained on real data.

At block 304, the processor produces, using a detector trained with synthetic data, predictions of heatmaps and bounding boxes for graphical objects in the detected chart regions. For example, the heatmaps may include graph lines and knee points for line charts. In some examples, the heatmaps may include points in the scatterplots. In various examples, the heatmaps may include detected edges in flowcharts. In some examples, the heatmaps may include pie centers, pie circumference, radial lines, and points of intersection for pie charts.

At block 306, the processor applies chart type specific analysis algorithm to the predicted heatmaps, bounding boxes, and text objects, to extract tabular chart data. In various examples, the chart type specific analysis algorithm may be used to associate and make inferences on the extracted tabular chart data. For example, the processor can determine how the sectors of a pie chart or the bars of a bar chart correspond to the labels in a detected legend.

At block 308, the processor generates a visualization based on the predicted heatmap and the extracted tabular chart data. For example, the visualization may be a reconstructed chart based on the extracted tabular chart data. In various examples, the processor may generate a table of the extracted tabular chart data. In some examples, the extracted tabular chart data may be provided in a JSON format.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
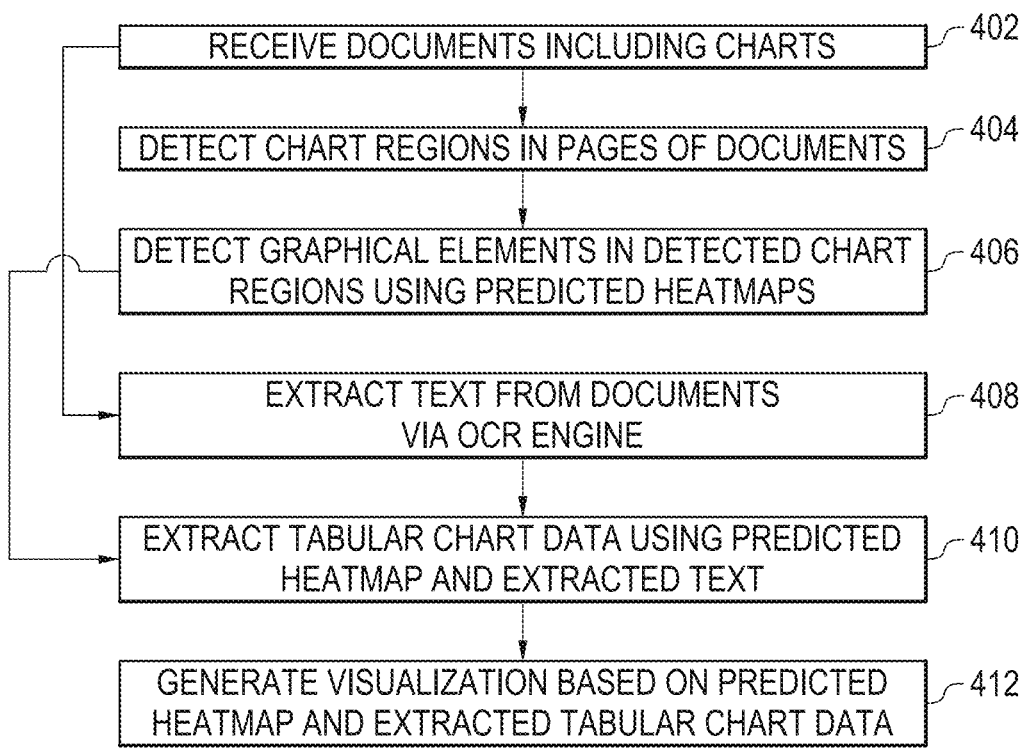
FIG. 4 is a process flow diagram of another example method that can detect graphical elements in charts using predicted heatmaps.

FIG. 4 is a process flow diagram of another example method that can detect graphical elements in charts using predicted heatmaps. The method 400 can be implemented with any suitable computing device, such as the computing device 500 of FIG. 5 and is described with reference to the system 100 of FIG. 1. For example, the methods described below can be implemented by the processor 502 or the processor 802 of FIGS. 5 and 8.

At block 402, a processor receives documents including charts. For example, the documents may include pie charts, line charts, bar charts, scatter plot charts, or any combination thereof.

At block 404, the processor detects chart regions in pages of the documents. For example, the chart regions may be detected using a chart regions detector trained on real data.

At block 406, the processor detects graphical elements in the detected chart regions using a heatmap predicted by a graphical elements detector trained on synthetic data. In some examples, the processor can produce a dedicated predicted heatmap for each of a number of graphical elements.

At block 408, the processor extracts, via an optical character recognition (OCR) engine, text from the documents. In various examples, the processor can process rotated text and numbers with exponents. For example, the processor may apply rotation to detected text prior to extracting the text from a document.

At block 410, the processor extracts tabular chart data using the predicted heatmap and extracted text. For example, the processor may extract the chart data using a dedicated chart type specific analysis model. In some examples, the processor can execute a color-based clustering. In some examples, for extracting tabular chart data from pie charts, the processor can determine an angle of each of a plurality of sectors of a pie chart and determining labels associated with each of the sectors.

At block 412, the processor generates a visualization based on the predicted heatmap and the extracted tabular chart data. For example, the visualization may be a reconstructed chart with bounding boxes indicating detected graphical elements and their values.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
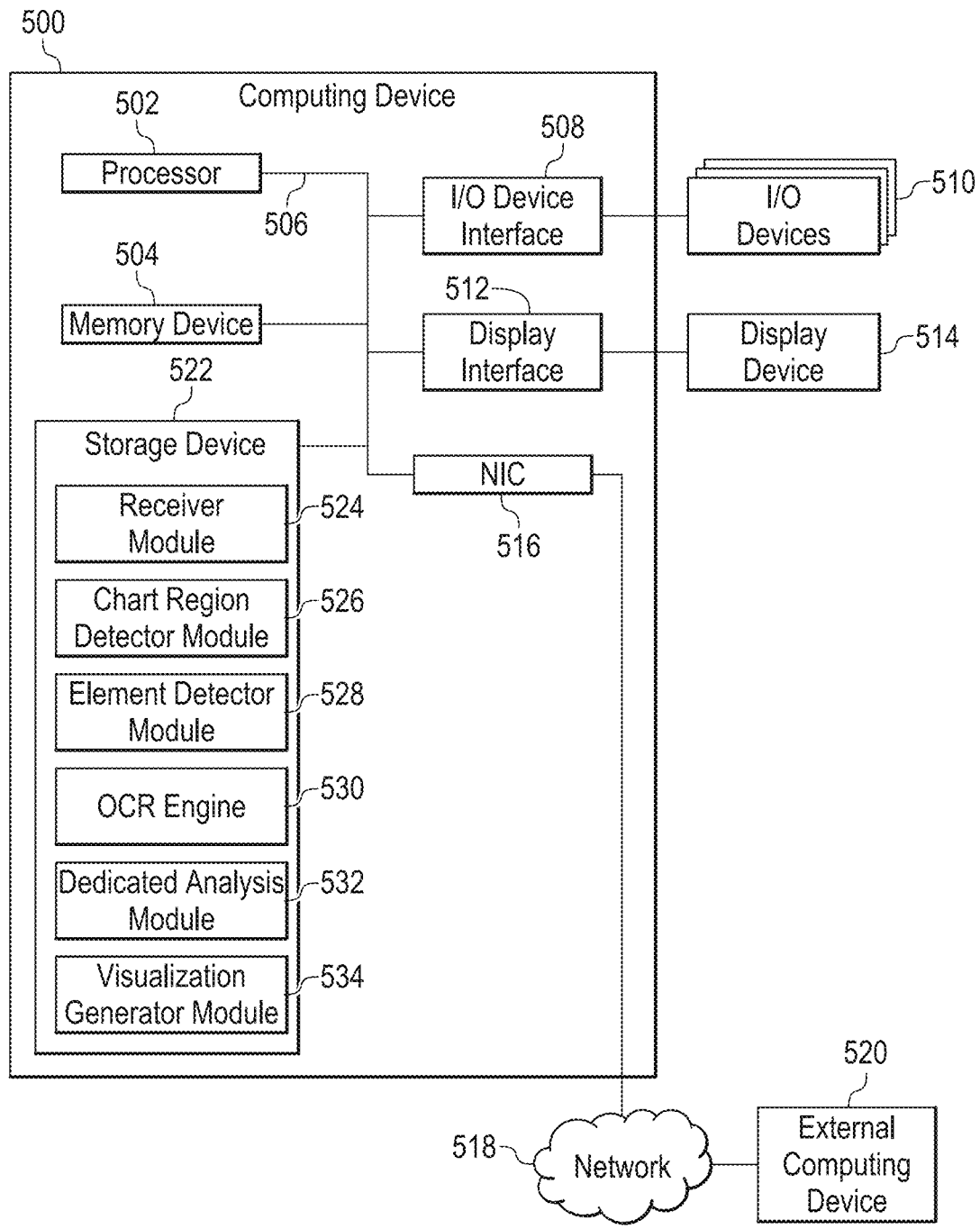
FIG. 5 is a block diagram of an example computing device that can detect graphical elements in charts using predicted heatmaps.

FIG. 5 is block diagram of an example computing device that can detect graphical elements in charts using predicted heatmaps. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a chart region detector module 526, an element detector module 528, an optical character recognition (OCR) engine 530, a dedicated analysis module 532, and a visualization generator module 534. The receiver module 524 can receive detected chart regions in a page of a document. For example the chart regions may have been detected using any suitable detector. In some examples, the receiver module 524 can receive a document including one or more charts. Alternatively, or in addition, the chart region detector module 526 can detect chart regions in a page of a received document. The element detector module 528 can produce predicted heatmaps and bounding boxes for graphical objects in the detected chart regions. In various examples, the element detector module 528 may have been trained using generated synthetic data. In some examples, the page may include a pie chart, and the predicted heatmaps may include heatmaps of a circumference, a center, radial lines, and an intersection of the radial lines and the circumference of the pie chart. In some examples the page includes a line chart, and the predicted heatmaps include a heatmap of the lines in the line chart. In some examples, the page includes a scatter plot, and the predicted heatmaps include a heatmap of markers in the scatter plot. The OCR engine 530 can extract text objects from the page of the document. The dedicated analysis module 532 can execute a chart type specific analysis algorithm on the predicted heatmaps and bounding boxes to extract tabular chart data. In various examples, the OCR engine 530 also include support for rotated text and numbers with exponents. For example, the OCR engine 530 can detect horizontally aligned text boxes where the text begins with the digits 10, and check if following digits are superscript. The visualization generator module 534 can generate an output data file and a visualization based on the predicted heatmap and the extracted tabular chart data. For example, the output data file may be a JSON file. In various examples, the visualization may be a reconstructed chart that visualizes the data in the output data file.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the chart region detector module 526, the element detector module 528, the OCR engine 530, the dedicated analysis module 532, and the visualization generator module 534 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the chart region detector module 526, the element detector module 528, the OCR engine 530, the dedicated analysis module 532, and the visualization generator module 534 can be implemented with logic, wherein the logic, as referred to herein, can include any suitable hardware (e.g., a processor, among others), software (e.g., an application, among others), firmware, or any suitable combination of hardware, software, and firmware.

Figure 6:
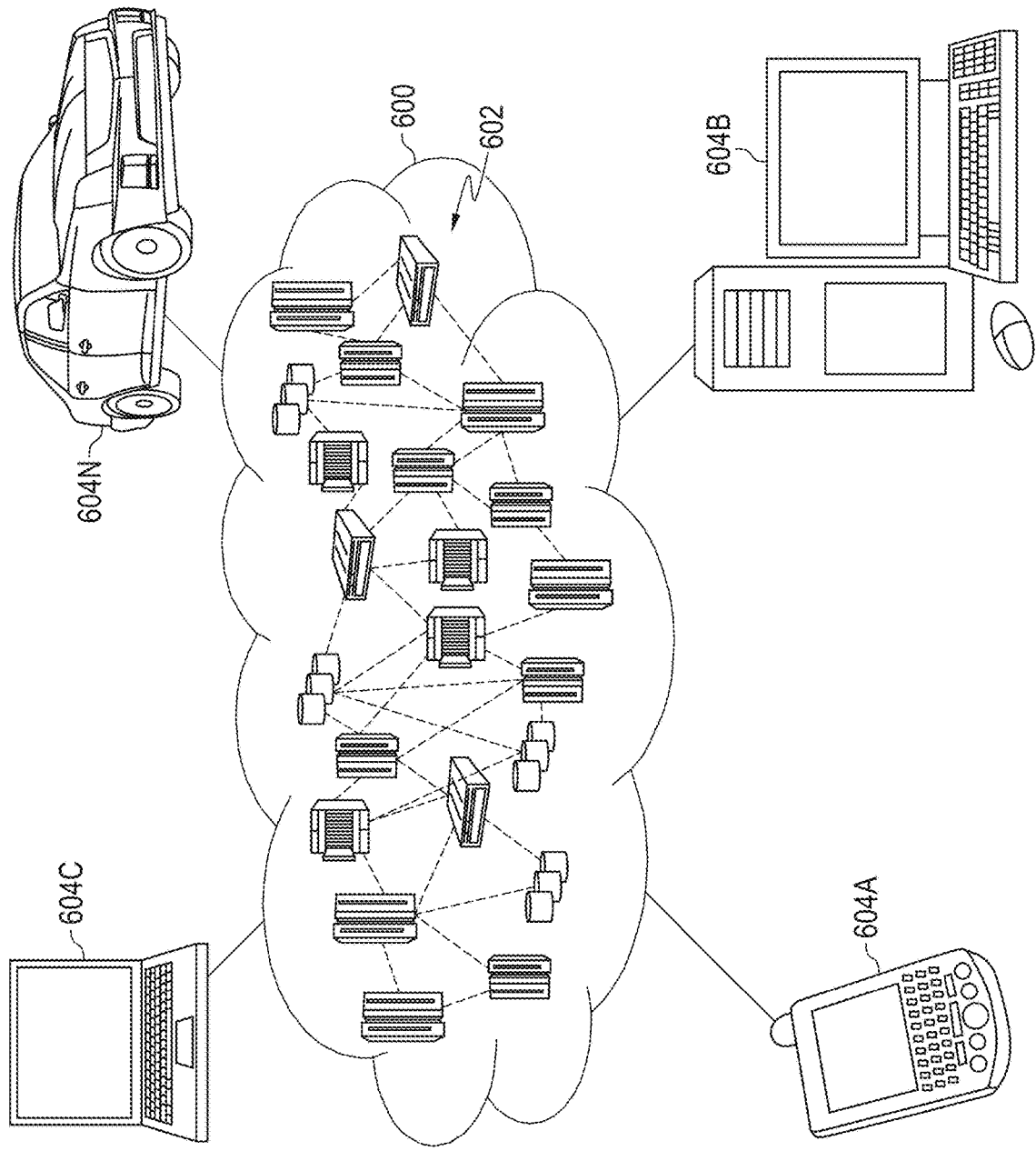
FIG. 6 is a diagram of an example cloud computing environment according to embodiments described herein.

Referring now to FIG. 6, illustrative cloud computing environment 600 is depicted. As shown, cloud computing environment 600 includes one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
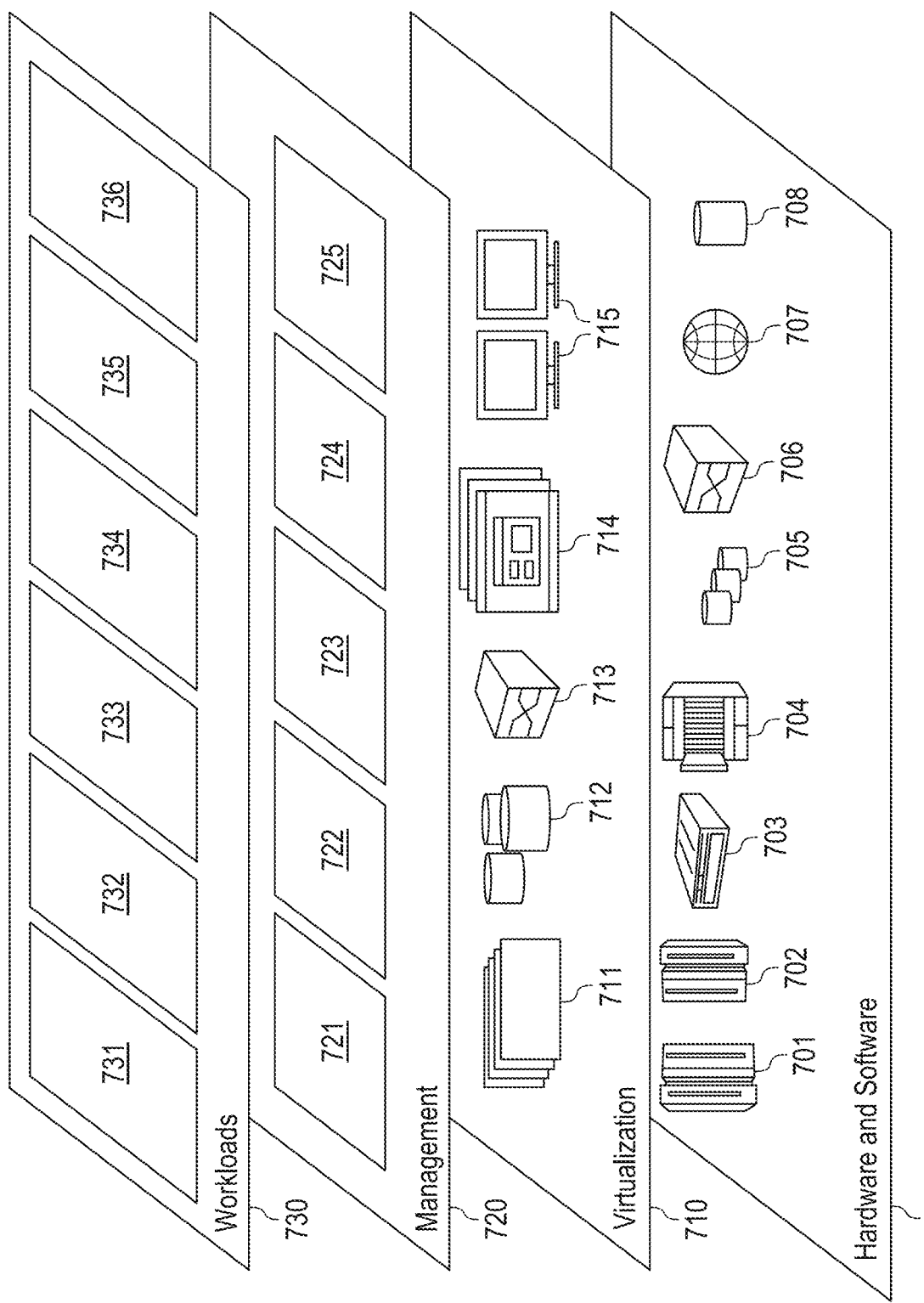
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 700 includes hardware and software components. Examples of hardware components include: mainframes 701; RISC (Reduced Instruction Set Computer) architecture based servers 702; servers 703; blade servers 704; storage devices 705; and networks and networking components 706. In some embodiments, software components include network application server software 707 and database software 708.

Virtualization layer 710 provides an abstraction layer from which the following examples of virtual entities may be provided: virtual servers 711; virtual storage 712; virtual networks 713, including virtual private networks; virtual applications and operating systems 714; and virtual clients 715.

In one example, management layer 720 may provide the functions described below. Resource provisioning 721 provides dynamic procurement of computing resources and other resources that are utilized to perform tasks within the cloud computing environment. Metering and Pricing 722 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 723 provides access to the cloud computing environment for consumers and system administrators. Service level management 724 provides cloud computing resource allocation and management such that required service levels are met. Service Level Agreement (SLA) planning and fulfillment 725 provide pre-arrangement for, and procurement of, cloud computing resources for which a future requirement is anticipated in accordance with an SLA.

Workloads layer 730 provides examples of functionality for which the cloud computing environment may be utilized. Examples of workloads and functions which may be provided from this layer include: mapping and navigation 731; software development and lifecycle management 732; virtual classroom education delivery 733; data analytics processing 734; transaction processing 735; and heatmap based data chart processing 736.

The present invention may be a system, a method and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
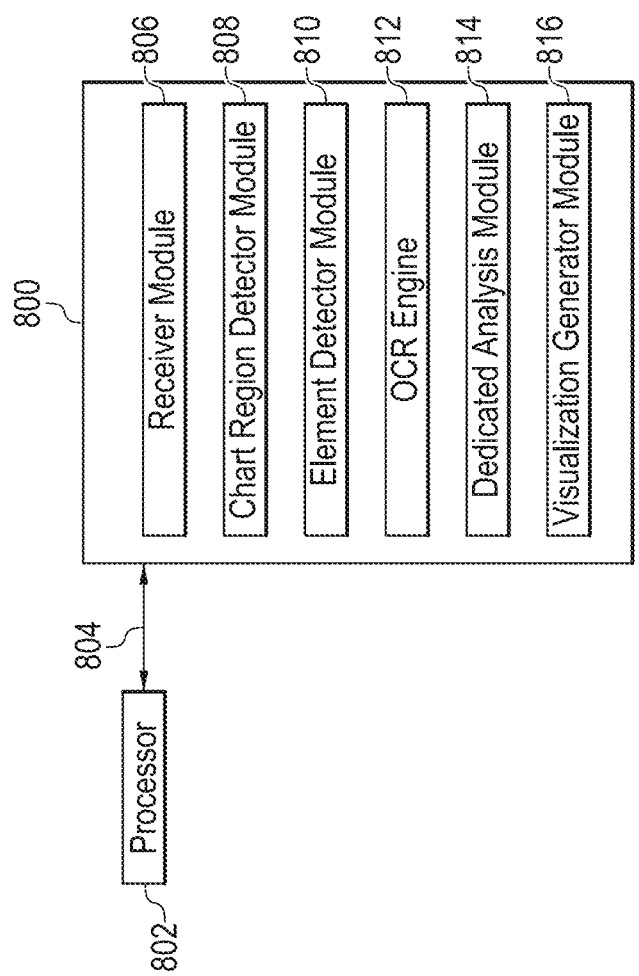
FIG. 8 is an example tangible, non-transitory computer-readable medium that can detect graphical elements in charts using predicted heatmaps.

Referring now to FIG. 8, a block diagram is depicted of an example tangible, non-transitory computer-readable medium 800 that can detect graphical elements in charts using predicted heatmaps. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200-400 of FIGS. 2-4.

The various software components discussed herein may be stored on the tangible, non-transitory, computer-readable medium 800, as indicated in FIG. 8. For example, a receiver module 806 includes code to receive a document including a chart. A chart region detector module 808 includes code to detect chart regions in a page of the document. An element detector module 810 includes code to produce, via a graphical elements detector, predicted heatmaps and bounding boxes for graphical objects in the detected chart regions. In various examples, the element detector module 810 includes code to produce a predicted heatmap for each of a plurality of graphical elements in the detected chart regions. An optical character recognition (OCR) engine 812 includes code to detect text in the detected chart regions. In various examples, the OCR engine 812 includes code to extract text objects from the page of the document, and apply the chart type specific analysis on the extracted text to extract the tabular chart data. In various examples, the OCR engine 812 includes support for rotated text and numbers with exponents. A dedicated analysis module 814 includes code to execute a chart type specific analysis algorithm on the predicted heatmaps and bounding boxes to extract tabular chart data. In some examples, the dedicated analysis module 814 includes code to execute a color-based clustering and convert clusters of pixels into a reconstructed graph. A visualization generator module 816 includes code to generate a visualization based on the predicted heatmap and the extracted tabular chart data. In some examples, the visualization generator module 816 includes code to generate JSON data based on the extracted tabular chart data, wherein the visualization is generated based on the JSON data.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application. For example, the computer-readable medium 800 may further include a trainer module including code to receive or generate synthetic training data and train the element detector module 810 on the synthetic training data using multi-task learning.

Figure 9:
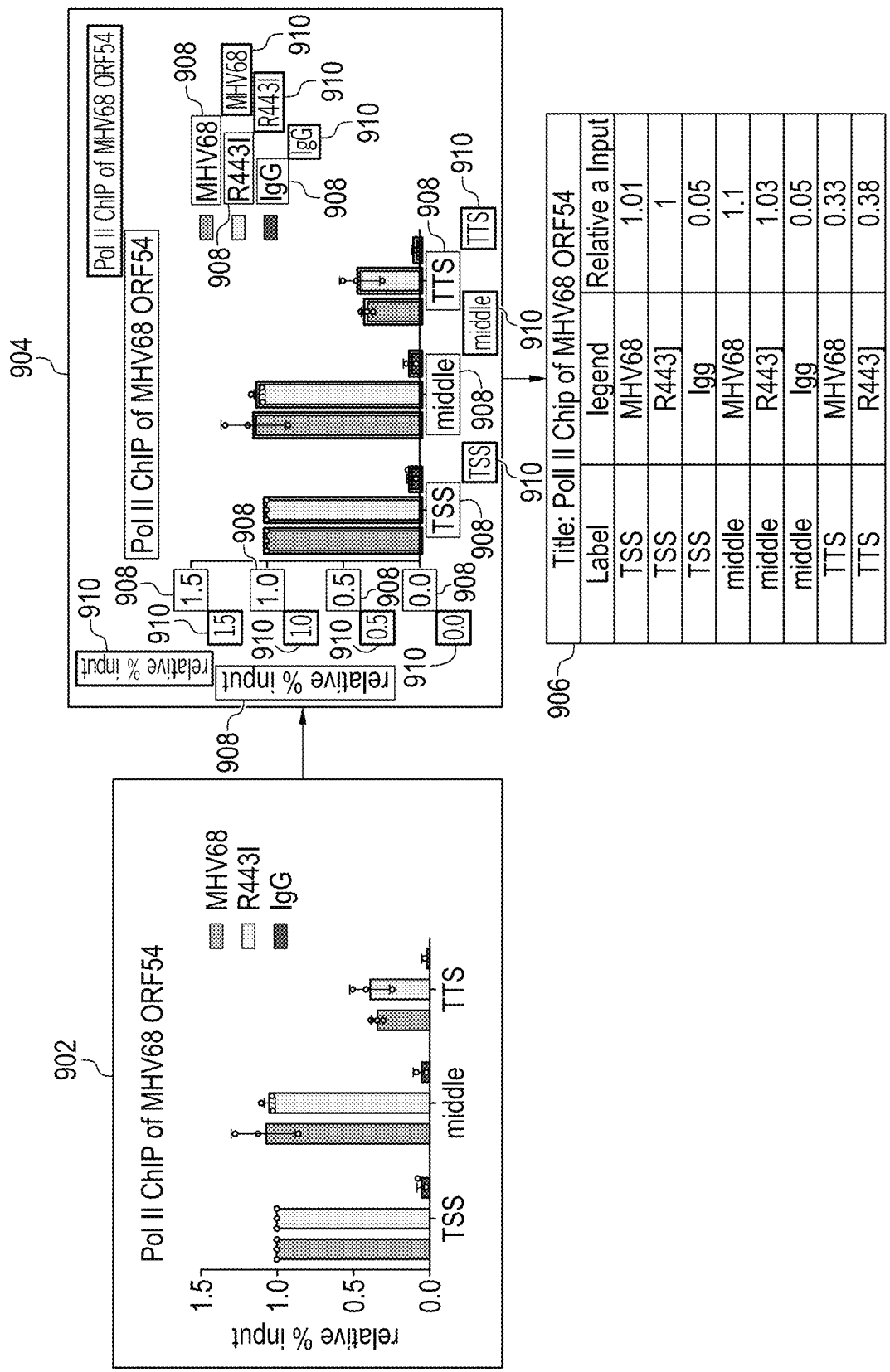
FIG. 9 is an example process illustrating detection and reconstruction of graphical elements in an example bar chart.

FIG. 9 is an example process illustrating detection and reconstruction of graphical elements in an example bar chart. The example process 900 can be implemented using the system 100 using the methods 200-400. For example, the process 900 can be executed using the processor 502 or the processor 802 of FIGS. 5 and 8.

In the example process 900, an example bar chart 902 is processed using the techniques described herein to generate a reconstructed bar chart 904 and a table of extracted data 906. The example bar chart 902 includes three sets of bars labeled "TSS" middle and "TTS." Each of the sets of bars includes a bar labeled "MHV68", a bar labeled "R443I" and a bar labeled "IgG." The bar chart includes a title "Pol II ChIP of MHV68 ORF54."

In various examples, the bar chart 902 may be processed via a chart region detector, chart elements detector and OCR engine to generate a reconstructed bar chart 904. The reconstructed bar chart 904 includes bounding boxes 908. For example, the bounding boxes 908 may identify each of the bars in the bar chart, as well as any text detected by the OCR engine. The reconstructed bar chart 904 also includes displayed extracted values 910 associated with each of the detected text objects. For example, each of the labels below the sets of bars as well as the labels in the legend specifying a label for each bar in each of the sets of bars.

In the example of FIG. 9, extracted data 906 is displayed in the form of a table. The extracted data 906 includes a list of headings including "label" corresponding to the "relative % input" y-axis labels below the sets of bars, "legend" corresponding to the labels in the legend, and "relative a input" corresponding to the values of the heights of the bars in the chart 902. In various examples, the extracted data 906 may be displayed in any suitable format. For example, the extracted data 906 may additionally, or alternatively, be transmitted in a JSON format.

It is to be understood that the diagram of FIG. 9 is not intended to indicate that the process 900 is to include all of the components shown in FIG. 9. Rather, the process 900 can include fewer or additional components not illustrated in FIG. 9 (e.g., additional bars, or additional data, texts, labels, legends, sets, tables, etc.).

Figure 10:
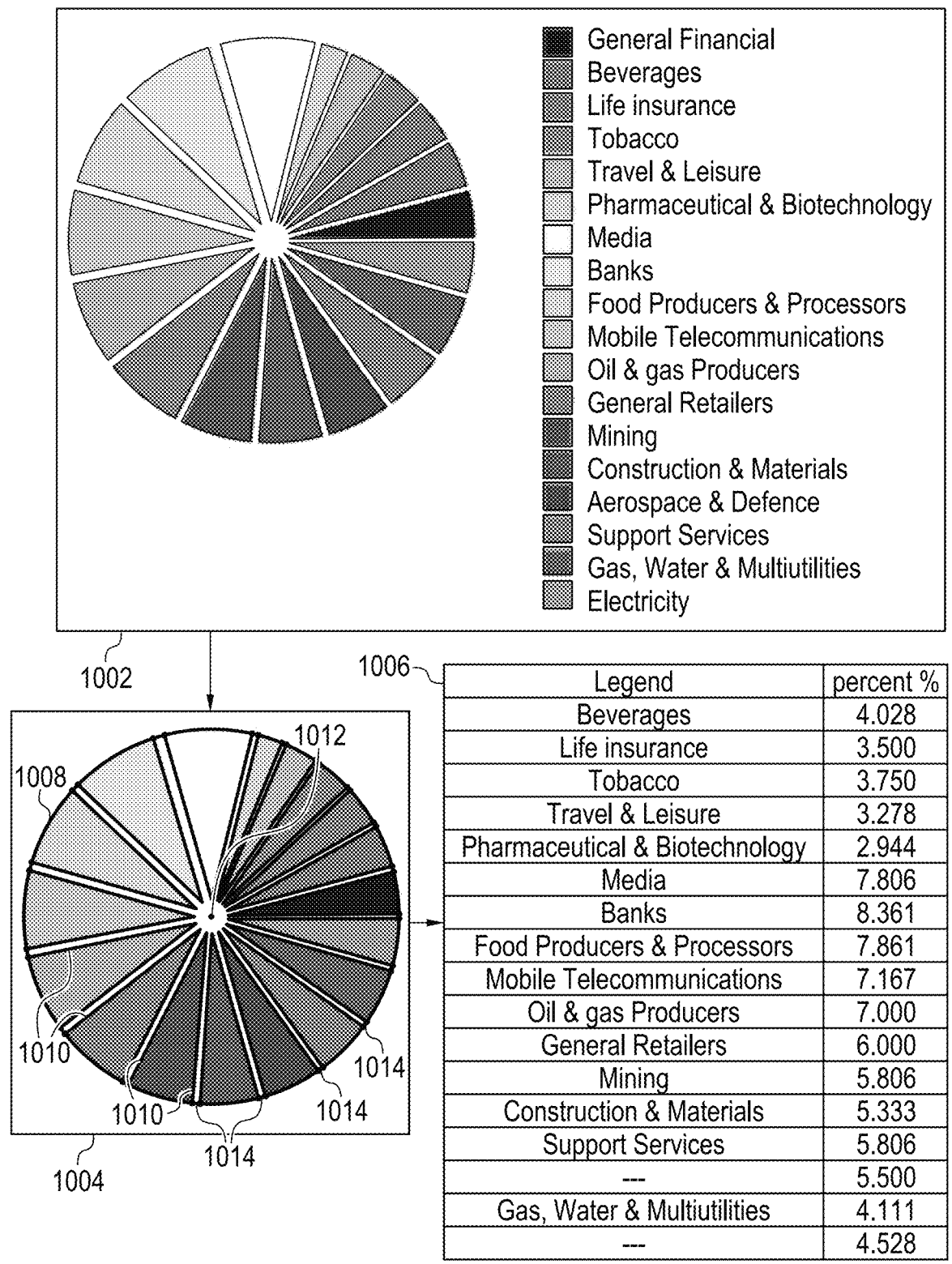
FIG. 10 is an example process illustrating detection and reconstruction of graphical elements in an example pie chart.

FIG. 10 is an example process illustrating detection and reconstruction of graphical elements in an example pie chart. The example process 1000 can be implemented using the system 100 using the methods 200-400. For example, the process 1000 can be executed using the processor 502 or the processor 802 of FIGS. 5 and 8. The process 1000 shows a pie chart 1002 with a legend describing various labels for the sectors of the pie chart. The process also includes generating a heatmap visualization 1004 for the pie chart and a table 1006 of extracted data.

The heatmap visualization 1004 includes a dedicated heatmap depicting a circumference 1008 of the pie chart. The heatmap visualization 1004 also includes a dedicated heatmap depicting the radial lines 1010 of the pie chart. The heatmap visualization 1004 also includes a dedicated heatmap depicting a center 1012 of the pie chart. In addition, the heatmap visualization 1004 includes a dedicated heatmap for intersections 1014 between the radial lines and the circumference of the pie chart. In various examples, an OCR engine may have extracted text from the legend in the pie chart 1002. In addition, a dedicated analysis module for pie charts may have extracted the percentage of each of the sectors with respect to the whole using angles and associated each of the sectors with a label using the legend. The resulting table 1006 may It is to be understood that the diagram of FIG. 10 is not intended to indicate that the process 1000 is to include all of the components shown in FIG. 10. Rather, the process 1000 can include fewer or additional components not illustrated in FIG. 10 (e.g., additional charts, or additional sectors, radial lines, legends, texts, etc.).

FIG. 11 is an example process illustrating detection and reconstruction of graphical elements in an example line chart. The example process 1100 can be implemented using the system 100 using the methods 200-400. For example, the process 1100 can be executed using the processor 502 or the processor 802 of FIGS. 5 and 8.

In the example of FIG. 11, a line chart 1102 is received in the form of an image of pixel values. Using the techniques described herein, a heatmap 1104 may be generated for the line chart 1102. In particular, the generated heatmap 1104 is shown highlighting the lines 1112 of the line chart 1102. For example, dashed lines appear as dashed heat marks and solid lines appear as solid heat markings. The heatmap 1104 is used to extract the lines 1112 to generate extracted graph region 1106. The extracted graph region 1106 is then used to generate reconstructed graph 1108. In the example of FIG. 11, a table 1110 includes values corresponding to a region of the reconstructed graph 1108.

It is to be understood that the diagram of FIG. 11 is not intended to indicate that the process 1100 is to include all of the components shown in FIG. 11. Rather, the process 1100 can include fewer or additional components not illustrated in FIG. 11 (e.g., additional charts, or additional lines, legends, texts, values, etc.).

Figure 12:
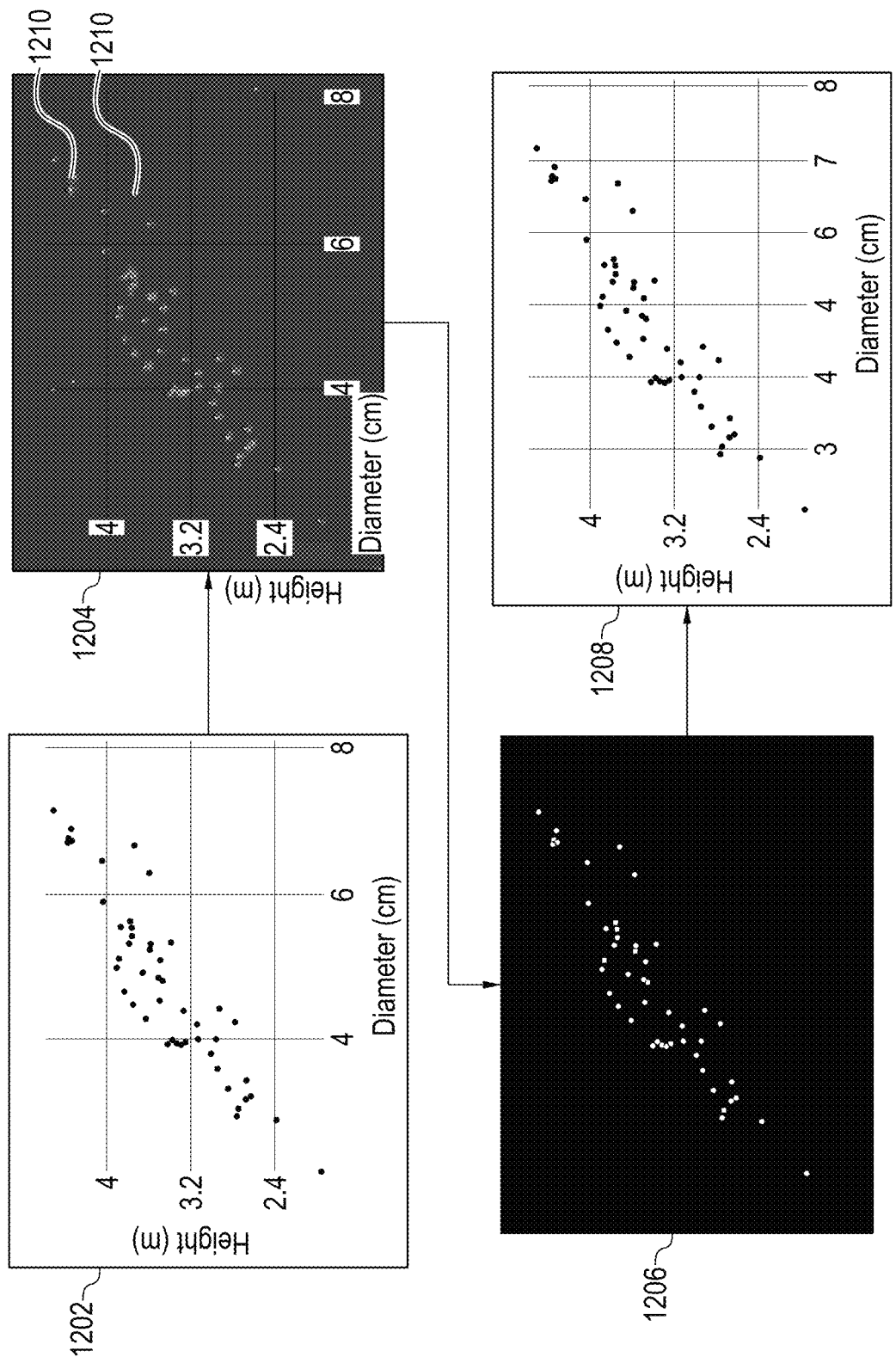
FIG. 12 is an example process illustrating detection and reconstruction of graphical elements in an example scatter plot.

FIG. 12 is an example process illustrating detection and reconstruction of graphical elements in an example scatter plot. The example process 1200 can be implemented using the system 100 using the methods 200-400. For example, the process 1200 can be executed using the processor 502 or the processor 802 of FIGS. 5 and 8.

The example scatter plot 1202 of FIG. 12 includes a series of points indicating values of height in the vertical axis and diameter in the horizontal axis. For example, the scatter plot 1202 may be received as an image including a number of pixel values. A heatmap 1204 generated using techniques described herein includes the detected points 1210 of the scatter plot. A resulting extracted graph region 1206 includes the detected points from the heatmap 1204. These extracted points are then included in a reconstructed scatter plot 1208. In the example of FIG. 12, the reconstructed scatter plot 1208 includes a horizontal axis with finer resolution. In some examples, the underlying data which the reconstructed scatter plot 1208 represents may also be provided in the form of a table (not shown).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a processor set;
one or more computer-readable storage media; and
program instructions stored on the one or more computer-readable storage media to cause the processor set to perform operation comprising:
receiving detected chart regions in a page of a document;
producing, via a graphical elements detector, predicted heatmaps and bounding boxes for graphical objects in the detected chart regions;
executing a chart type specific analysis algorithm on the predicted heatmaps and bounding boxes to extract tabular chart data; and
generating an output data file and a visualization based on the predicted heatmaps and the tabular chart data.

2. The computer system of claim 1, comprising an optical character recognition engine to extract text objects from the page of the document, wherein the tabular chart data comprises the text objects, wherein the optical character recognition engine comprises support for rotated text and numbers with exponents.

3. The computer system of claim 1, wherein the graphical elements detector is trained using generated synthetic data.

4. The computer system of claim 1, comprising a chart regions detector to detect chart regions in the document, wherein the chart regions detector is trained using real data.

5. The computer system of claim 1, wherein the page comprises a pie chart, and the predicted heatmaps comprise heatmaps of a circumference, a center, radial lines, and an intersection of the radial lines and the circumference of the pie chart.

6. The computer system of claim 1, wherein the page comprises a line chart, and the predicted heatmaps comprise a heatmap of lines in the line chart.

7. The computer system of claim 1, wherein the page comprises a scatter plot, and the predicted heatmaps comprise a heatmap of markers in the scatter plot.

8. The computer system of claim 1, wherein the page comprises a flowchart, and the predicted heatmaps comprise a heatmap of edges in the flowchart.

9. A method, comprising:
receiving, via a processor, detected chart regions in a page of a document;
producing, via a graphical elements detector, predicted heatmaps and bounding boxes for graphical objects in the detected chart regions;

applying, via the processor, a chart type specific analysis algorithm to the predicted heatmaps and bounding boxes, to extract tabular chart data; and generating, via the processor, an output data file and a visualization based on the predicted heatmaps and the tabular chart data.

10. The method of claim 9, further comprising:

generating JSON data based on the tabular chart data, wherein the visualization is generated based on the JSON data.

11. The method of claim 9, further comprising:

extracting, via an optical character recognition engine, text objects from the page of the document, and applying the chart type specific analysis algorithm on the text objects to extract the tabular chart data, wherein the optical character recognition engine is to process rotated text and numbers with exponents.

12. The method of claim 9, wherein the producing, via the graphical elements detector, the predicted heatmaps comprises:

producing a dedicated predicted heatmap for each of a plurality of graphical elements.

13. The method of claim 9, wherein the applying, via the processor, the chart type specific analysis algorithm comprises executing a color-based clustering.

14. The method of claim 9, wherein applying the chart type specific analysis algorithm further comprises:

determining an angle of each of a plurality of sectors of a pie chart and determining labels associated with each of the plurality of sectors.

15. A computer program product comprising:

one or more computer-readable storage media; and program instructions stored on the one or more computer-readable storage media to perform operations comprising:

receiving a document comprising a chart;

detecting chart regions in a page of the document;

producing, via a graphical elements detector, predicted heatmaps and bounding boxes for graphical objects in the chart regions;

executing a chart type specific analysis algorithm on the predicted heatmaps and bounding boxes to extract tabular chart data; and generating an output data file and a visualization based on the predicted heatmaps and the tabular chart data.

16. The computer program product of claim 15, wherein the operations further comprises:

generating synthetic training data; and training the graphical elements detector on the synthetic training data using multi-task learning.

17. The computer program product of claim 15, wherein the operations further comprises:

generating JSON data based on the tabular chart data, wherein the visualization is generated based on the JSON data.

18. The computer program product of claim 15, wherein the operations further comprises:

producing a predicted heatmap for each of a plurality of graphical elements in the chart regions.

19. The computer program product of claim 15, wherein the operations further comprises:

extracting, via an optical character recognition engine, text objects from the page of the document; and applying the chart type specific analysis algorithm on the text objects to extract the tabular chart data, wherein the optical character recognition engine comprises support for rotated text and numbers with exponents.

20. The computer program product of claim 15, wherein the operations further comprises:

executing a color-based clustering and convert clusters of pixels into a reconstructed graph.

* * * * *